July 10, 1962   F. H. SWANSER   3,043,221
ROCKET PROPULSION METHOD AND MEANS
Filed June 2, 1958   3 Sheets-Sheet 1
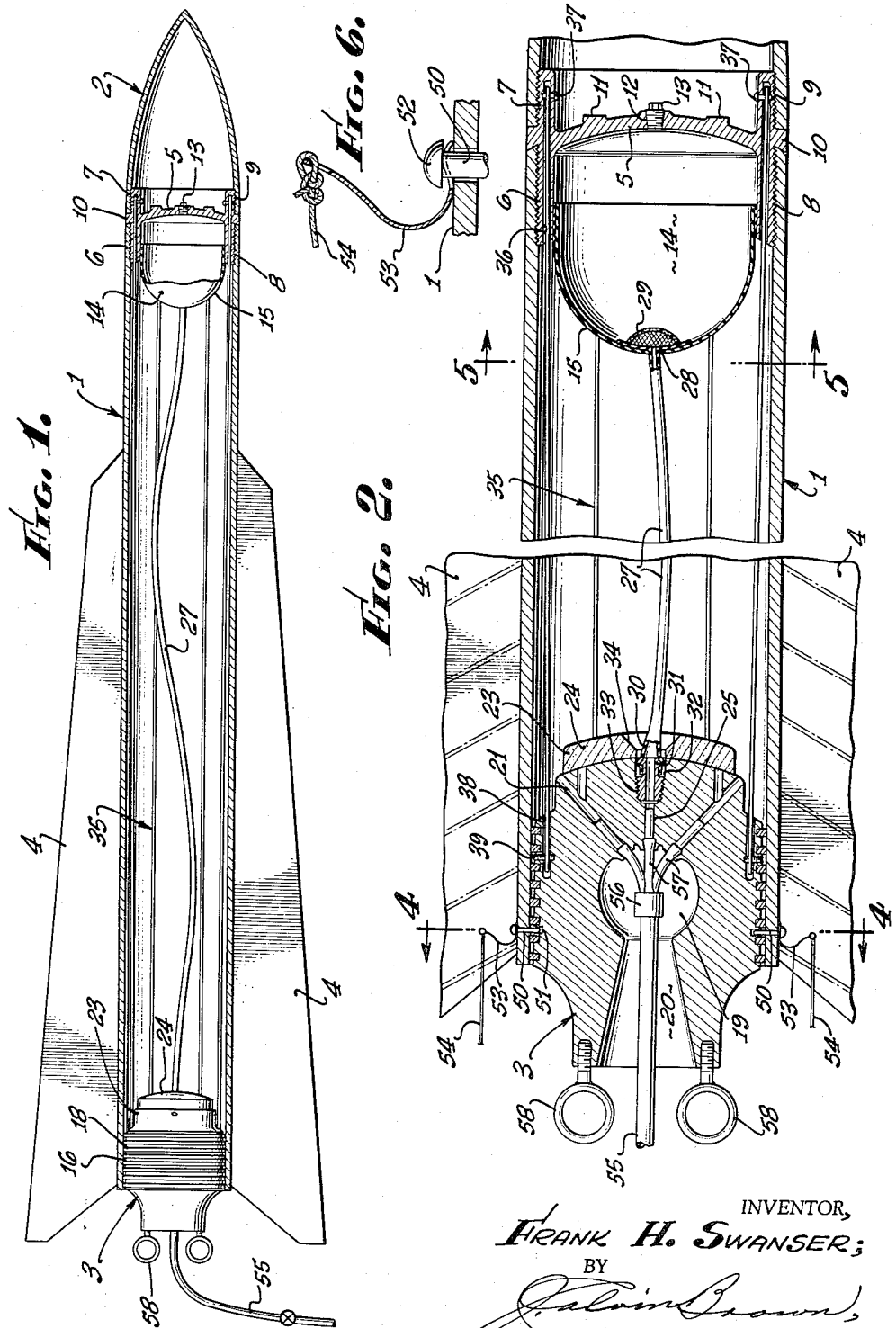
INVENTOR,
FRANK H. SWANSER;
BY
ATTORNEY.

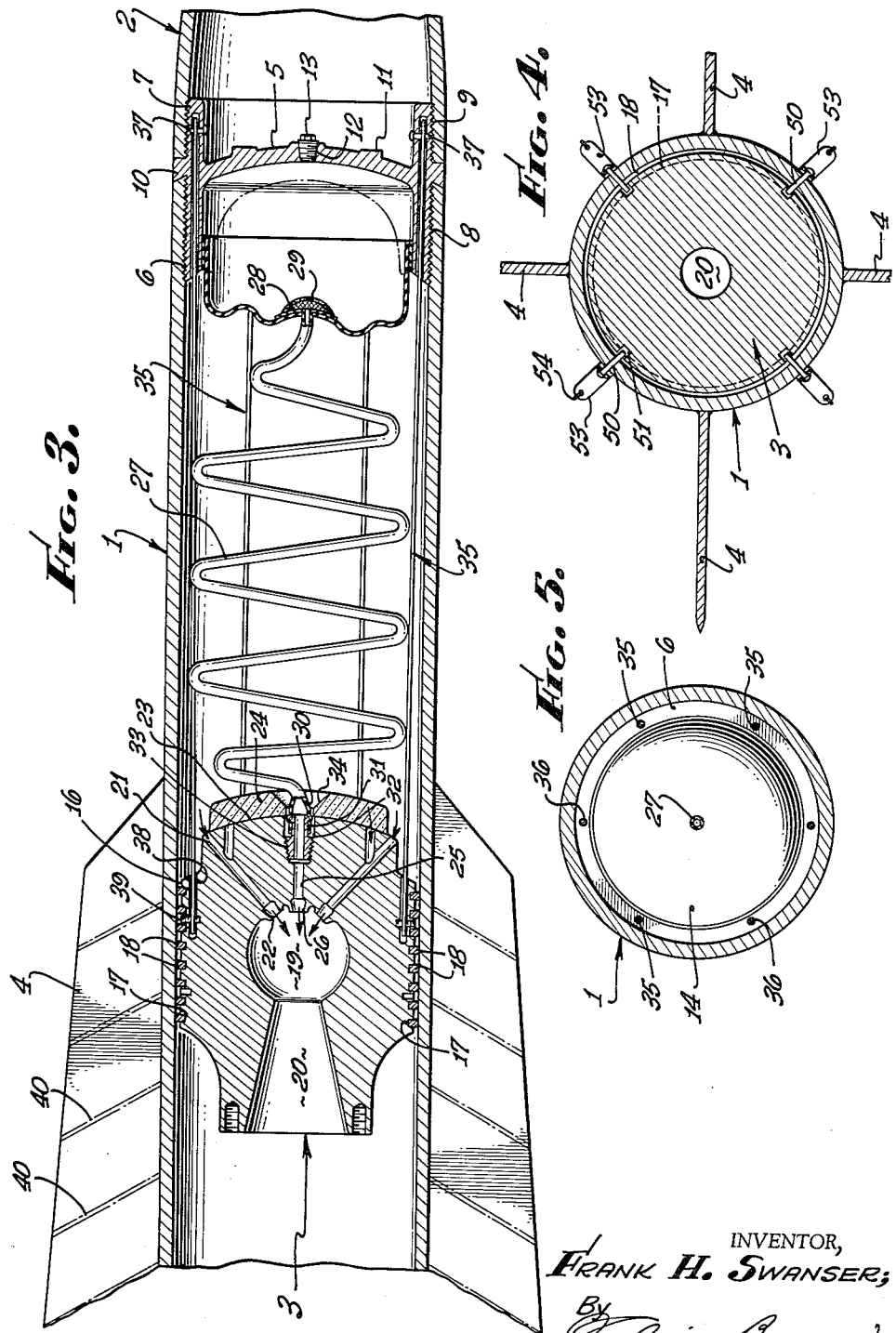

July 10, 1962 F. H. SWANSER 3,043,221
ROCKET PROPULSION METHOD AND MEANS
Filed June 2, 1958 3 Sheets-Sheet 3

INVENTOR,
Frank H. Swanser;
BY
ATTORNEY.

United States Patent Office 3,043,221
Patented July 10, 1962

3,043,221
ROCKET PROPULSION METHOD AND MEANS
Frank H. Swanser, 3139 W. 152nd Place, Gardena, Calif.
Filed June 2, 1958, Ser. No. 739,334
6 Claims. (Cl. 102—49)

The present invention relates to rockets generally and more specifically to a propulsion means for rockets.

Experience and experiment have demonstrated that rocket motors utilize propellants at a great rate and that a pressurized fuel supply must be maintained for liquid fueled rockets. By way of example, the well known V–2 Rocket must have the fuel delivered to the combustion chamber at a flow rate of 124 pounds per second at a pressure of 310 pounds per square inch of fuel and of oxidant at a flow rate of 153 pounds per second at a pressure of 250 pounds per square inch. The well known V–2 Rocket incorporates pumps as well as a steam producer. Generally turbo pumps are utilized and such pumps are subject to cavitation. In addition to this, it is essential that there be a feed pressure differential in the combustion chamber otherwise the rocket would not function efficiently as it is realized that there must be a pressure exerted on both the oxidant and the fuel supply to the combustion chamber wherein chemical energy is transformed into heat energy and thence to kinetic energy for propelling the rocket. The combustion chamber pressure, of course, must not overbalance the force necessary in present rocket motors of delivering the oxidant and the fuel from their separate tanks to the combustion chamber. All of this imposes design problems of great magnitude.

I have, by the present invention, eliminated and reduced the working parts of the rocket, whether it be of a single stage or multiple stage type and wherein certain complicated parts, such as, for instance, various pumps for the oxidant and for the fuel, as separate units are done away with, and the said rocket motor in and of itself imposes the pressure necessary to deliver the fuel and oxidant at a proper flow rate and pressure into the combustion chamber.

I do not, by this invention, contemplate any particular fuel or oxidant in the use of a so-called bi-propellant, as I may readily use any of the said propellants now known in the art.

By way of example, I may utilize as a fuel gasoline in combination with concentrated nitric acid and/or concentrated hydrogen peroxide, also providing rich sources of chemically combined oxygen. I may utilize as an alternative to oxygen, reactive fluorine in conjunction with hydrogen which is capable of producing an exhaust velocity in excess of 10,900 feet per second. As a fuel the use of hydrocarbons is indicated, such as methyl alcohol, ethyl alcohol, gasoline, and aniline. Others which may be used are compounds such as ammonia, hydrazine, and diborane. In fact, liquid hydrogen in and of itself has been used as a fuel.

However, whatever the propellant, it is essential that the fuel and the oxidant be separated within the rocket body and yet delivered to the combustion chamber for combination to produce the essential thrust. In certain instances it may be necessary to utilize an igniter for igniting the combined oxidant and fuel. However, such an instrumentality forms no part of the present invention.

One of the important considerations in rocket construction and propulsion is mass ratio, which means the initial mass of the rocket plus propellants divided by the final mass of the rocket less propellants. Any improvement in the value of these terms will increase the final velocity of the rocket and/or range, and the present invention is efficient in mass ratio, in that the propellants may be stored away economically and utilize a maximum of space with lighter tankage and over-all rocket weight with resultant higher velocity. This is very important when it is realized that scientists have determined that a rocket to leave the earth completely requires a velocity of approximately 25,000 miles per hour, which would require a rocket having a mass ratio of 6 with propellant combinations and rocket motors producing exhaust velocities of 14,750 to 20,500 feet per second.

An object of this invention is to provide a propulsion means offering simplicity of rocket design, and specifically to instrumentalities in said design that are unlikely to malfunction and which permits almost the entire rocket body to be used for fuel with resultant high mass ratio.

A further object is a rocket design which is capable of efficient results compared to known rockets and specifically adaptable for military use in small rockets. By way of example, the present design permits a rocket to be built of small diameter, say 4 inches in diameter, with a length of 72 inches, from available stock materials having a mass ratio of 3 to 1.

A further object is a rocket design which permits the use of any liquid or viscous fuel combination desired.

A further object is a rocket design which is efficient in operation, inexpensive in cost of manufacture, superior to designs now known to the inventor, foolproof in its operation, of use both for the military and for the launching of satellites; of few parts and generally superior to rockets now known to the inventor. In addition, the present rocket design adapts itself to mass production.

In the drawing:

FIGURE 1 is a longitudinal sectional view of a single stage rocket incorporating the invention;

FIGURE 2 is a fragmentary longitudinal sectional view, on an enlarged scale, of the rocket motor and tanks for the bi-propellant fuels;

FIGURE 3 is a fragmentary longitudinal sectional view, similar to that of FIGURE 2, and showing movement of the rocket motor within the body of the rocket;

FIGURE 4 is a fragmentary sectional view on the line 4—4 of FIGURE 2 and looking in the direction of the arrows;

FIGURE 5 is a sectional view on the line 5—5 of FIGURE 2 and looking in the direction of arrows;

FIGURE 6 is a fragmentary sectional detail of means utilized for holding the motor in a defined position and prior to ignition of the rocket fuels in the combustion chamber of said said motor;

Figure 7:
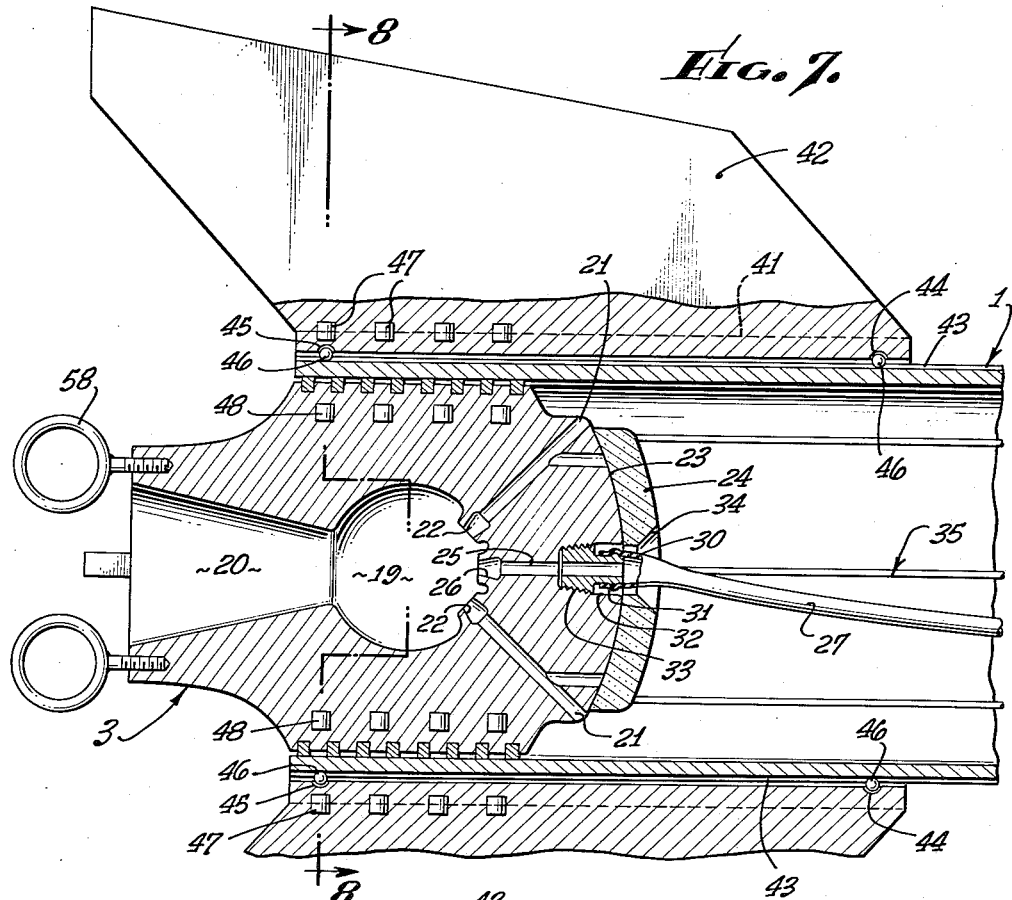
FIGURE 7 is a fragmentary enlarged longitudinal sectional view of the rocket motor within the body of the rocket, with means for causing longitudinal travel of the stabilizing fins for said rocket as the rocket motor moves inwardly of the rocket body.

Referring now to the drawings and specifically to FIGURE 1, I have shown a rocket which includes a substantially tubular shell or body 1 closed at one end by a nose cone 2, the opposite end being open and adapted to receive within said open end a rocket motor or engine 3. The rocket body or casing is elongated, the length depending upon the amount of propellant to be carried within the said casing or body. To stabilize and direct the path of movement of the rocket, I have shown, carried on the periphery and extending radially from the casing or body, a series of equi-distantly spaced apart fins designated generally as 4.

At the nose cone end of the rocket is a head 5 of concavo-convex form and provided with annular flanges 6 and 7 which are integral and externally threaded, as shown at 8 and 9, the threaded areas being separated by an annulus 10 adapted to space ends of the body or casing 1 and the nose cone 2. The outer end of the casing or body 1 is internally screw threaded, as is likewise the nose cone 2, for connection with said threads 8 and 9. The concave surface of the head 5 is smooth while the external surface is provided with bosses or projections 11 which function as second stage motor rests in multi-stage rocket construction. The head is provided with a screw threaded tapered bore at 12 to receive a threaded plug 13, which affords an easy method of filling a tank, bladder or sac to be described. The tank in question is designated by the numeral 14 and in the present instance is formed of a flexible material which may be collapsed inwardly so as to fit within the concave surface of the head 5. This tank constitutes a membrane or bladder of some form, or a fuel sac, and may be fabricated from various materials which are not materially affected by ethyl fuels, whatever their nature, or acid oxidants. I have in mind for the material of said tank 14 a polyethylene as such a material is not affected by the average acid oxidant. However, I do not confine my invention to the use of this material alone, as materials which are non-reactive or inert to alkaline or acid oxidants and fuels are generally known to those skilled in this art.

I provide a suitable seal at the perimeter of said tank for connection with what may be termed the skirt or inner surface of flange 6 of said head 5. Again seals are available on the market and adaptable for this purpose. It will be noted that the sac or tank 14 is substantially hemispherical in form with its curved surface 15 facing the motor 3 in the rocket body or shell.

The opposite end of the body or shell 1 receives the motor 3, and this motor has a cylindrical surfaced portion 16 formed with peripheral annular grooves 17, of which there may be a plurality, adapted to receive rings 18 for engagement with the inner surface of the body or casing 1 to affect a sealing engagement between the body of the motor and the body or shell 1. Preferably, I use for rings 18 a material which will give minimum friction or resistance to movement of the motor, and which will withstand a high degree of heat and not be affected by caustics or acids. A material known under the trade name of Teflon, and which is a tetrafluorethylene compound, may be used, although other materials now known to those skilled in the art may be employed. Furthermore, the motor body should be formed from a material which is resistant to acids and caustics and likewise heat-resistant, and for this purpose a ceramic material may be employed. The motor body is provided with a central combustion chamber of spherical form, as shown at 19, and said chamber is in direct communication with a nozzle 20, in the present instance of conical form, with the base end of the cone at the outer end of said motor body. It will be noted that the truncated end of the nozzle communicates with the combustion chamber to form a throat. Extending at an angle to the axis of said motor are a plurality of oxidizer ducts designated generally by the numeral 21, which communicate with the periphery of the motor body and with the combustion chamber 19. These oxidizer ducts at the zone of communication with the combustion chamber are provided with injectors 22, so that the oxidizer, whatever its nature, when under pressure is directed to a common center or the radial center of the combustion chamber. The head 23 of the motor has a curved periphery which has mounted thereon a pad 24, both the inner mounting surface of said pad and the outer surface being curved, the curvature of which corresponds to the curvature of the concavity of head 5. Preferably, this pad constitutes a piston head and may be formed of any acid resistant (stable) material, such as fiber glass. This portion of the motor provides a piston for movement within the rocket body or casing 1, and the inlet ends of the ducts 21 are spaced around the perimeter of said pad as shown in the several figures. Both the pad 24 and the motor are axially bored at 25 to provide a duct with its injector 26 radial to the spherical combustion chamber 19. A helical flexible tube 27 has one end thereof secured to a suitable fitting carried by the tank or sac 14 as shown at 28, with said tube having communication with the interior of said tank or sac through a guard 29. The guard may be of any material desired to minimize the chance that a fold of the collapsing sac will block or interfere with the fluid discharge into tube 27. The opposite end 30 of said tube 27 is passed through a central opening of the pad 24 and through the medium of suitable fittings designated generally as 31, communicates with the duct 25. The fittings 31 may take various forms and, as shown in the several figures, may, by way of example, consist in an axial counterbore 32 in the motor body, the counterbore bounding wall having a tapered screw threaded portion 33 to receive an axially bored tapered threaded plug securing the end of the tube. It is to be noted that the pad 24 is provided with a central conical bore 34 with the base end of the cone lying on the convex surface of said pad. This construction is utilized in order to allow the tube 27 to assume different angularities relative to the said conical bore without imposing a transverse stress thereon. Preferably, this tube is given a pre-set shape in the form of a helix and the tube is made from a material similar to that of the tank or sac 14. This material may be a polyethylene, by way of example. Thus, viewing FIGURE 1, the tube is elongated, while in FIGURE 3 the tube, due to its preformed helix, is now forming into coils as the motor advances within the body or shell 1.

I provide for my invention a series of elastic members which may be springs or rubber cords so treated or formed as to be resistant to deterioration by oxidizers. These cords or springs constitute a tension means extending between tank 14 and the motor 3. For ease of description, I will designate the tension means by the numeral 35. The flanges 6 and 7 are longitudinally bored at 36 to receive one end of said tension means, which end is pinned or otherwise held as shown at 37, within and to said flanges. Preferably, the bore or bores 36 will have a greater diameter than the diameter of the tension means, so that said means may stretch within the said bore or bores. A like construction is provided for the motor in that the body is longitudinally bored as shown at 38 to receive the opposite end or ends of said tension means with the end or ends secured within said bore or bores 38 by suitable means such as by pins 39. As stated, a plurality of said tension means is provided at spaced points as illustrated in FIGURE 2, and the construction shown, as well as the method for securing ends of each tension means, allows for residual tension therein, as hereinafter set forth in the statement of operation.

In the form of the invention shown in FIGURES 2 and 3, it will be noted that the fins 4 are constructed so as to be burned away during rocket operation by the blast from the rocket motor. I provide for each fin, spaced trimming portions, designated generally as 40 which may constitute a trim of thermite. However, as the rocket fuel is used up, the end of the rocket body or shell will burn away and the fins will likewise burn away as the body or casing decreases in length towards the nose cone. The fins, however, are of such length that said fins act as stabilizers and direct the rocket path even though the body is decreasing in length. To accomplish this desired result, each fin may be formed from two separate thin sheets of material with interspaced intervals of seams of thermite as indicated at 40 or of a magnesium tape.

Figure 8:
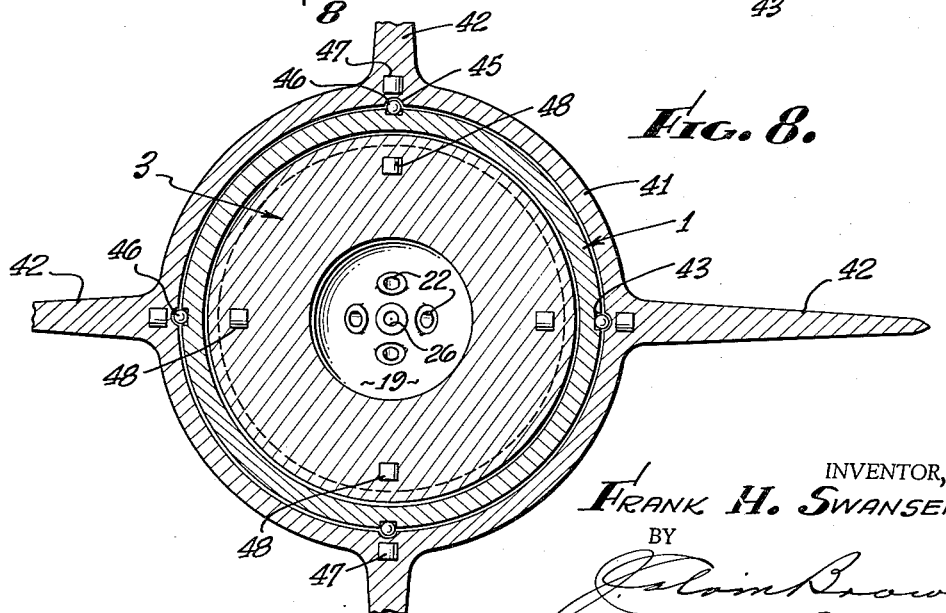
FIGURE 8 is a fragmentary sectional view on the line 8—8 of FIGURE 7.

I may utilize a second construction for longer rockets as depicted in FIGURES 7 and 8, and wherein I provide an elongated tube 41 provided on its periphery with radially extending equi-distantly spaced apart fins 42. The ring 41 surrounds the tubular body or shell 1, and the shell 1 is provided on its surface with equi-distantly spaced apart and longitudinally extending grooves 43, preferably in the plane of each radial fin. The tube 41 is provided with hemispherical sockets 44 and 45, for receiving bearings designated generally as 46 which ride within the grooves 43. It will be noted in FIGURE 8 that four grooves 43 are provided with corresponding bearings 46 therein. This construction is utilized so that the fins and associated structure, to wit, the tube 41, may move through the medium of the bearings 46 forwardly on said body or shell 1. To produce such a movement, I have provided magnets, designated generally as 47 and 48, in both the motor and the tube 41. These magnets are in opposed aligned relationship, a plurality thereof is intended, and as the motor moves longitudinally within the body or shell, the fin structure is likewise moved simultaneously therewith.

I have shown means whereby the motor 3 may be held adjacent the open end of the casing or shell 1, and which means constitutes one or more pins 50 passed transversely through the shell or body 1 for reception within aligned bores 51 of the motor, the heads 52 of said pins being provided with strips 53 functioning as pin pullers, each pin puller being connected with a cord 54, a pull upon the cord or cords simultaneously releasing the pins from engagement with the bores 51 of the motor.

Initially, the motor is in communication with a valved pipe 55, the pipe through a connection 56 being provided with a series of tubes 57 in direct connection with the injectors 22 and 26 of the propellant ducts 21 and 25.

In addition, the motor is provided with temporary holding rings 58.

The operation, uses and advantages of the invention just disclosed are as follows:

Initially the motor is in the position shown in FIGURES 1 and 2 relative to the body 1. The nose cone 2 being removed, the sac or tank 14 may be filled with fuel, in this case a fuel of some character, as previously set forth. After tank 14 has been filled, the plug 13 is replaced. The body 1 is then filled with an oxidizer, such as red fuming nitric acid, HNO₃, of some form, and which extends between the inner end of the motor and the curved surface of tank 14. In this position, the flexible tube 27 is elongated, as shown in FIGURE 1. I may, in certain installations, reverse the procedure and the body of the rocket may be filled with a fuel, while the tank 14 is filled with an oxidant. It is evident that a further tank, similar to 14, may be included within the body 1, with suitable connections to the motor combustion chamber. Whatever the character of the fluids, fuel and oxidant, I assume that the tanks have been filled, and passage of the fluids into the combustion chamber is provided by the tubes 57 which communicate with the injectors 22 and 26. The rocket may be mounted for launching in any usual manner, either normal to a surface or at an angle thereto, depending upon the use and purpose of the rocket. Certain oxidants and fuels will combine and, in so doing, ignite and create thrust. The tension means 35 constantly exerts an inward pull upon the motor to pressure the fuel or oxidizer contained within the body or shell.

After the tanks have been filled with fluids, a series of tubes 57 are inserted through the exhaust nozzle 20 and combustion chamber 19 into the fuel and oxidizer ducts 25, 21. These tubes or fingers 57 are formed from an elastic or rubber compound, capable of resisting adverse effects of rocket fuel components. The tubes 57 are of a size to closely fit and conform to the walls of the fuel and oxidizer ducts 25, 21. The tubes 57 are sealed at their innermost ends. The tubes 57 are led to a common juncture 56 with a single larger tube 55. The large tube is led to a selected firing control position. The entire tube arrangement, 55, 56, 57, is then pressurized by air or other medium, to a degree of pressure that will cause the "fingers" 57 or small tubes, to expand against the walls of the fuel and oxidizer ducts 25, 21, and thus cause them to be tightly sealed against the flow of fuel components through the ducts.

The entire tube arrangement is provided with a valve or pressure release device which will permit the operator to cause the rocket to fire at the will of the operator. Fluids exert outward pressure on tubes in ducts 21, 25. Release of pressure in tubes 57 causes them to lose gripping and sealing effect in ducts 21, 25. Fluids now force tubes 57 out of ducts 21, 25 and flow into combustion chamber where they commingle.

If a fuel which will not ignite is utilized, then an igniter may be provided. However, assuming that the oxidizer and the fuel ignite, the motor may be released by releasing the temporary connections with the holding rings 58 and by releasing the pins 50 by pulling upon the cords 54. The moment combustion occurs in the combustion chamber 19, the heat energy is converted into kinetic energy with a resulting thrust both inwardly and outwardly of the motor. This inward thrust causes the motor to exert a pressure against the oxidizer contained within the body or shell 1, and this pressure is likewise exerted upon the fuel within the sac or tank 14, with the result that both fuel and oxidant are directed through the fuel ducts and the oxidant duct shown at 25 and 21, and through the injectors 22 and 26 to cause the combination between said oxidant and said fuel in the combustion chamber at approximately the center thereof. Pressure rapidly builds up with the motor moving axially of the body or shell to maintain a flow rate of fuel and of oxidant into the combustion chamber under pressure. As the oxidizer within the body and the fuel in the tank 14 are used up, the tube 27 moves from its elongated form of FIGURE 1 to the helical form of FIGURE 3 and the tank 14 collapses inwardly, as shown in FIGURE 3. The tension means 35 also exerts tension on the motor to move the same toward the tank 14 and finally to cause the pad 24 to impinge against the tank in its collapsed position, to wit, the position shown by dotted lines in FIGURE 3, with a residual tension in said means due to the fact that said means are received within bores of the flanges 6 and 7 of the head and 38 of the motor.

I have provided by this invention a construction wherein the motor moves within the shell or body to pressurize the oxidizer within the body and likewise to pressurize the fuel within a second tank of flexible nature, with the result that various complicated structures such as turbines and the like for feeding the fuel and oxidant are done away with, as are likewise complicated valve structures and other instrumentalities. I am assured by my construction that there will be proper combustion within the combustion chamber to drive the rocket forwardly as long as fuel and oxidant remain therein, and that substantially all of the fuel and oxidant will be utilized. In addition, as the hot flame from the rocket burns away the rocket body as the motor advances in the body, the fin structure will either be moved along the body to maintain stabilization by the use of magnets, as illustrated in FIGURES 7 and 8, or by the simple expedient of providing burning edges or tapes at spaced points of the fin, as illustrated in FIGURE 3.

I have not detailed specific materials for the rocket structure as materials are known which are effective for the building of the rcokb,Igyvoan dddah saieeehdntte the building of the rocket body, and I have designated the use of a ceramic material for the motor or combinations of metal and ceramic material.

I claim:

1. In rocket construction, an elongated tubular casing, a head closing one end of said casing, a collapsible fuel tank within the casing and adjacent the head, the opposite end of the casing being open, a motor within the casing and movable from the open end thereof toward the collapsible fuel tank, said motor having a combustion chamber and a nozzle leading from the combustion chamber outwardly of the motor, said casing adapted to hold an oxidizer between the inner end of the motor and the collapsible fuel tank, said motor provided with ducts communicating between the combustion chamber and externally of the motor for receiving the oxidizer contained within the cylindrical casing, and means of communication with the interior of the collapsible fuel tank and the combustion chamber of the motor; comprising a tube resistant to caustics and acids and having a pre-set shape of a conical helix.

2. In rocket construction, an elongated cylindrical casing having a uniform internal diameter throughout its length, a head closing one end of said casing, a collapsible fuel tank within the casing and adjacent the head, a motor within the cylindrical casing having a body the periphery of which is in close fit engagement with said cylindrical casing and movable from the open end thereof toward the collapsible fuel tank, said motor body having an internal combustion chamber and nozzle leading from the combustion chamber and directed outwardly of the motor body toward the open end of the casing, said cylindrical casing adapted to hold an oxidizer between the inner end of the motor body and the collapsible fuel tank, said motor body provided with ducts communicating between the combustion chamber and externally of the motor body for receiving the oxidizer contained within the cylindrical casing, means of communication with the interior of the collapsible fuel tank and the combustion chamber of the motor body, and tension means between the head and said motor body for urging the motor body at all times to move axially of said casing towards said collapsible fuel tank.

3. In rocket construction, an elongated cylindrical casing having a uniform internal diameter throughout its length, a head closing one end of said casing, a collapsible fuel tank within the casing and adjacent the head, a motor within the cylindrical casing having a body the periphery of which is in close fit engagement with said cylindrical casing and movable from the open end thereof toward the collapsible fuel tank, said motor body having an internal combustion chamber and nozzle leading from the combustion chamber and directed outwardly of the motor body toward the open end of the casing, said cylindrical casing adapted to hold an oxidizer between the inner end of the motor body and the collapsible fuel tank, said motor body provided with ducts communicating between the combustion chamber and externally of the motor body for receiving the oxidizer contained within the cylindrical casing, means of communication with the interior of the collapsible fuel tank and the combustion chamber of the motor body, said casing being externally provided with stabilizing fins, and means between the motor body and the fins for axially moving said fins on said casing as said motor body moves toward the collapsible tank.

4. In rocket construction, an elongated cylindrical casing having a uniform internal diameter throughout its length, a head closing one end of said casing, a collapsible fuel tank within the casing and adjacent the head, a motor within the cylindrical casing having a body the periphery of which is in close fit engagement with said cylindrical casing and movable from the open end thereof toward the collapsible fuel tank, said motor body having an internal combustion chamber and nozzle leading from the combustion chamber and directed outwardly of the motor body toward the open end of the casing, said cylindrical casing adapted to hold an oxidizer between the inner end of the motor body and the collapsible fuel tank, said motor body provided with ducts communicating between the combustion chamber and externally of the motor body for receiving the oxidizer contained within the cylindrical casing, means of communication with the interior of the collapsible fuel tank and the combustion chamber of the motor body, said casing being provided externally with fins, each fin of which is formed with spaced seams of rapid burning, high temperature self-oxidizing incendiary material.

5. In rocket construction, an elongated cylindrical casing having a uniform internal diameter throughout its length, a head closing one end of said casing, a collapsible fuel tank within the casing and adjacent the head, a motor within the cylindrical casing having a body the periphery of which is in close fit engagement with said cylindrical casing and movable from the open end thereof toward the collapsible fuel tank, said motor body having an internal combustion chamber and nozzle leading from the combustion chamber and directed outwardly of the motor body toward the open end of the casing, said cylindrical casing adapted to hold an oxidizer between the inner end of the motor body and the collapsible fuel tank, said motor body provided with ducts communicating between the combustion chamber and externally of the motor body for receiving the oxidizer contained within the cylindrical casing, means of communication with the interior of the collapsible fuel tank and the combustion chamber of the motor body, said casing being formed on its periphery with longitudinally extending grooves, there being a tube surrounding said casing and radial fins extending from said tube, balls socketed in the tube for reception in the longitudinal grooves of the casing, magnets in said motor, and opposed magnets in the tube for producing movement of the tube as the motor body moves within the casing.

6. In rocket construction, an elongated cylindrical casing having a uniform internal diameter throughout its length, a head closing one end of said casing, a collapsible fuel tank within the casing and adjacent the head, a motor within the cylindrical casing having a body the periphery of which is in close fit engagement with said cylindrical casing and movable from the open end thereof toward the collapsible fuel tank, said motor body having an internal combustion chamber and nozzle leading from the combustion chamber and directed outwardly of the motor body toward the open end of the casing, said cylindrical casing adapted to hold an oxidizer between the inner end of the motor body and the collapsible fuel tank, said motor body provided with ducts communicating between the combustion chamber and externally of the motor body for receiving the oxidizer contained within the cylindrical casing, means of communication with the interior of the collapsible fuel tank and the combustion chamber of the motor body, and means for applying an additional force to the motor to thereby place the oxidizer under a pressure greater than that of the combustion chamber.

References Cited in the file of this patent

UNITED STATES PATENTS

| | | |
|---|---|---|
| 2,114,214 | Damblanc | Apr. 12, 1938 |
| 2,536,597 | Goddard | Jan. 2, 1951 |
| 2,686,473 | Vogel | Aug. 17, 1954 |
| 2,700,337 | Cumming | Jan. 25, 1955 |
| 2,752,850 | Warner et al. | July 3, 1956 |
| 2,753,801 | Cumming | July 10, 1956 |
| 2,789,505 | Cumming et al. | Apr. 23, 1957 |
| 2,868,127 | Fox | Jan. 13, 1959 |